United States Patent [19]
Nishizawa et al.

[11] Patent Number: 4,505,980
[45] Date of Patent: Mar. 19, 1985

[54] INSULATED WIRE

[75] Inventors: Hiroshi Nishizawa, Kitaiabaraki; Yoshiyuki Mukoyama, Hitachi; Shozo Kasai, Hitachi; Yasunori Okada, Hitachi, all of Japan

[73] Assignee: Hitachi Chemical Co., Ltd., Tokyo, Japan

[21] Appl. No.: 439,199

[22] Filed: Nov. 4, 1982

[30] Foreign Application Priority Data

Oct. 8, 1982 [JP] Japan ................. 57-178168

[51] Int. Cl.$^3$ .................. B32B 27/00; H01B 7/00
[52] U.S. Cl. ................. 428/383; 174/110 N; 174/120 SR; 427/118; 427/120
[58] Field of Search ......... 428/375, 379, 383; 174/110 N, 120 SR, 120 C; 427/118, 120, 117; 528/73

[56] References Cited

U.S. PATENT DOCUMENTS 3,493,413  2/1970  Olson et al. .......... 174/110 N
3,528,852  9/1970  Olson et al. .......... 174/120 SR
4,294,952  10/1981 Mukoyama et al. ..... 174/110 SR
4,378,407  3/1983  Yamamoto et al. ..... 428/383

Primary Examiner—Lorraine T. Kendell
Attorney, Agent, or Firm—Antonelli, Terry & Wands

[57] ABSTRACT

An insulated wire having excellent heat resistance, abrasion resistance and flexibility can be prepared by coating on an electric conductor directly or via another insulating material a polyamide-imide resin composition prepared by reacting an aromatic diisocyanate and a tricarboxylic acid anhydride in the presence of a basic solvent while adjusting the resin content at 40% by weight or more, and adding to the reaction system a lactam in an amount of 0.1 to 1.0 mole per mole of the aromatic diisocyanate, and if necessary, an alcohol and/or an oxime in an amount of 0.01 to 0.5 mole per mole of the aromatic diisocyanate before, during or after the above-mentioned reaction to mask terminal functional groups and to make the reduced viscosity of the composition 0.1 to 0.27, and baking the resin composition.

24 Claims, No Drawings

INSULATED WIRE

BACKGROUND OF THE INVENTION

This invention relates to an insulated wire obtained by coating a polyamide-imide resin composition varnish on an electric conductor and baking the varnish.

In the prior art, as polyamide-imide resins used in varnishes for heat-resistance electric wire, there have heretofore been used those which are obtained by using N-methylpyrrolidone (NMP) as a solvent for synthesis. These varnishes have a reduced viscosity (concentration: 0.5 g/dl, solvent: dimethylformamide, measurement temperature: 30° C.) of more than 0.4 and have a sufficiently increased molecular weight. On the other hand, since the solution viscosities of varnishes for electric wire are set at about 30 poises (30° C.) in the case of die coating because of restriction as to coating workability, the resin content of the above-mentioned polyamide-imide resins with a high molecular weight satisfying this requirement has an upper limit of about 30% by weight even if a good solvent, NMP, is used. Therefore, when such polyamide-imide resins with a high molecular weight are used in varnishes for electric wire, a large amount of expensive NMP must be used, and this poses a problem from the viewpoint of the cost.

One method for reducing the cost by decreasing the amount of NMP and increasing the resin content is to lower the molecular weight of the resin. However, when the molecular weight of a polyamide-imide resin obtained from a diisocyanate and a tricarboxylic acid anhydride is lowered so that the reduced viscosity of the resin may be 0.4 or lower, the terminal functional group concentration of the resin increases, so that the viscosity of the resulting varnish increases gradually with the lapse of time. This increase in viscosity causes a problem of marked lowering of the storage stability. In the case where the viscosity has increased as days go by, when the resin is used, for example, as a varnish for electric wire, there are caused inconveniences such as the alteration of initially set coating conditions and the adjustment of the viscosity by diluting the varnish having an increased viscosity with a solvent, and characteristics of a protective coating film formed by volatilizing the solvent sometimes vary.

There is a proposal aiming at removing these disadvantages, of a process for producing a stabilized polyamide-imide resin varnish capable of having a high resin content in which terminal functional groups are masked with a specific active-hydrogen-containing compound. This process provides greatly improved storage stability for a polyamide-imide resin having a lowered molecular weight, but the process requires the employment of a more strict stabilizing technique for polyamide-imide resins which have a lowered molecular weight for making the reduced viscosity 0.3 or lower and which have a greatly increased resin content. That is to say, it is necessary to devise a stabilizing method so that polyamide-imide resins stabilized in such a lower molecular weight region may show a sufficient cure reactivity at the time of baking and curing. Particularly when there is used such an active-hydrogen-containing compound wherein the terminal functional groups are masked by thermally irreversible bonding groups in a usual baking temperature range, the resulting resin is greatly damaged in cure reactivity, though it is excellent in storage stability.

SUMMARY OF THE INVENTION

An object of this invention is to provide an insulated wire obtained by coating on an electric conductor directly or via another insulating material a polyamide-imide resin composition having a high resin content and good storage stability with excellent cure reactivity thereby overcoming the problems mentioned above.

The present inventors effected resinification reactions under various synthesis conditions, varying the kind of agents for masking the terminal functional groups of the resulting polyamide-imide resin (masking agents), the amounts of agents used, the molecular weight of the resin and the like, and investigated in detail relationships between the resin composition of the resulting resin and its practical performance characteristics to accomplish this invention.

This invention provides an insulated wire obtained by coating on an electric conductor directly or via another insulating material a polyamide-imide resin composition prepared by a process comprising reacting an aromatic diisocyanate (I) and a tricarboxylic acid anhydride (II) in approximately equimolar amounts in the presence of a basic solvent while adjusting the resin content at 40% by weight or more, and adding a lactam (III) in an amount of 0.1 to 1.0 mole per mole of the aromatic diisocyanate (I), and if necessary, an alcohol (IV) and/or an oxime (V) in an amount of 0.01 to 0.5 mole per mole of the aromatic diisocyanate (I) separately or simultaneously before, during or after the above-mentioned reaction so as to mask functional groups present in the reaction system and to make the reduced viscosity of the resin 0.1 to 0.27, and baking the resin composition.

DESCRIPTION OF PREFERRED EMBODIMENTS

The most preferable method for adding masking agents for obtaining excellent practical performance characteristics without damaging the cure reactivity is to add first a lactam before, during or after the reaction to mask terminal functional groups (mainly, isocyanate groups) and then to add an alcohol and/or an oxime after the reaction to mask terminal functional groups (mainly, acid anhydride groups). From the viewpoint of the cure reactivity of the resulting resin, the isocyanate group is preferably masked by the lactam. But it is possible to react an alcohol and/or an oxime with a tricarboxylic acid anhydride, and then reacting therewith an aromatic diisocyanate, followed by the reaction with a lactam. It is also possible to react an alcohol and/or an oxime with the tricarboxylic acid anhydride, and subsequently add thereto an aromatic diisocyanate and a lactam to react at the same time.

According to this invention, a polyamide-imide resin composition which can give a varnish having a high resin content of about 40–55% by weight, and which is excellent in long-term storage stability is particularly preferable as a varnish for producing heat-resistant electric wire.

The aromatic diisocyanate used in this invention includes, for example, tolylene diisocyanate, xylylene diisocyanate, 4,4'-diphenylether diisocyanate, naphthalene-1,5-diisocyanate, 4,4'-diphenylmethane diisocyanate, isophorone diisocyanate, 1,6-hexamethylene diisocyanate, cyclohexane diisocyanate, etc. When the heat resistance and the like are taken into consideration, it is preferable to use 4,4'-diphenylmethane diisocyanate or tolylene diisocyanate. If necessary, there may be co-used aliphatic diisocyanates such as 1,6-hexamethylene diisocyanate, isophorone diisocyanate and the like, alicyclic diisocyanates, trimers thereof, isocyanurate-ring-containing polyisocyanates obtained by trimerization reaction of the aforesaid aromatic diisocyanates, polyphenylmethyl polyisocyanates, e.g., a phosgenated condensate of aniline and formaldehyde, etc. In particular, isocyanurate-ring-containing polyisocyanates obtained by trimerization reaction of tolylene diisocyanate or 4,4'-diphenylmethane diisocyanate which are effective for improving the heat resistance, are preferred, and their used amount is preferably 0.03 to 0.20 equivalent per equivalent of the aromatic diisocyanate when the resulting varnish is used for heat-resistant electric wire.

As the tricarboxylic acid anhydride, there can be used, for example, compounds represented by the general formulas (i) and (ii):

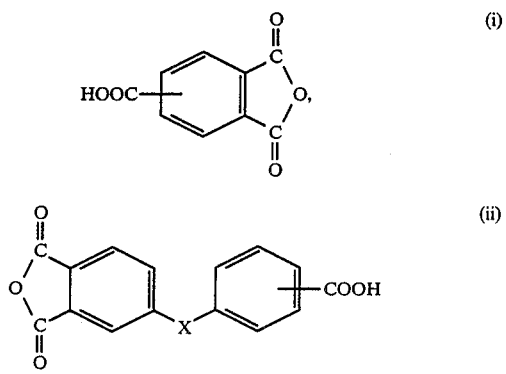

wherein X is —$CH_2$—, —CO—, —$SO_2$—, —O— or the like. When the heat resistance, the cost and the like are taken into consideration, trimellitic acid anhydride is preferred.

If necessary, polycarboxylic acids or acid anhydrides thereof other than the tricarboxylic acid anhydride described above may also be co-used. As such polycarboxylic acids, there can be used, for example, trimellitic acid, trimesic acid, tris(2-carboxyethyl)isocyanurate, terephthalic acid, isophthalic acid, succinic acid, adipic acid, sebacic acid, dodecanedicarboxylic acid and the like.

As the polycarboxylic acid anhydrides, there can be used dianhydrides of tetrabasic acids, for example, aliphatic and alicyclic tetrabasic acids such as 1,2,3,4-butanetetracarboxylic acid, cyclopentanetetracarboxylic acid, ethylenetetracarboxylic acids, bicyclo-[2,2,2]-octo-(7)-ene-2:3,5:6-tetracarboxylic acid and the like; aromatic tetrabasic acids such as pyromellitic acid, 3,3',4,4'-benzophenonetetracarboxylic acid, bis(3,4-dicarboxyphenyl)ether, 2,3,6,7-naphthalenetetracarboxylic acid, 1,2,5,6-naphthalenetetracarboxylic acid, ethylene glycol bistrimellitate, 2,2'-bis(3,4-biscarboxyphenyl)propane, 2,2',3,3'-diphenyltetracarboxylic acid, perylene-3,4,9,10-tetracarboxylic acid, 3,4-dicarboxyphenylsulfonic acid and the like; heterocyclic tetrabasic acids such as thiophene-2,3,4,5-tetracarboxylic acid, pyrazinetetracarboxylic acid and the like; etc.

These polycarboxylic acids or acid anhydrides thereof may be used for improving resin characteristics such as flexibility, solubility in solvents, melt-flow characteristics (processability) in molding and processing, cure reactivity, and the like. In particular, 3,3',4,4'-benzophenonetetracarboxylic acid dianhydride effective for improving the cure reactivity is perferred. The using amount of 3,3',4,4'-benzophenonetetracarboxylic acid dianhydride is preferably in the range of 0.03 to 0.2 mole per mole of the tricarboxylic acid anhydride.

The aromatic diisocyanate and the tricarboxylic acid anhydride are reacted in approximately equimolar amounts. When they are reacted in approximately equimolar amounts, a polyamide-imide resin having a sufficiently high molecular weight is obtained at the time of baking and curing, and shows the best heat resistance and flexibility. Although the diisocyanate compound may be added in slightly excessive amount of moles in consideration of the fact that a small amount of water contained as an impurity in the reaction solvent reacts with isocyanate groups, the amount of the aromatic diisocyanate compound must be not more than 1.1 moles per mole of the tricarboxylic acid anhydride.

As the basic solvent, there can be used those which are substantially inert to the aromatic diisocyanates. For example, N-methylpyrrolidone, N,N-dimethylformamide, N,N-dimethylacetamide, dimethylsulfoxide, hexamethylphosphoneamide, N-methyl-caprolactam, and the like can be used. As a synthesis solvent for the aromatic diisocyanate and the tricarboxylic acid anhydride, N-methylpyrrolidone is preferred. As a dilution solvent used after the reaction, dimethylformamide is preferred. Dimethylformamide has an effect of lowering the solution viscosity of the resulting varnish, and contributes to the increase of the resin content.

As to the resin concentration during the reaction, when the resin content is less than 40% by weight, the excess solvent should be removed after the synthesis by complicated procedures such as condensation or the like, so that an economical disadvantage is brought about. When the cost, the performance characteristics and the like are taken into consideration, the resin content is preferably 40 to 80% by weight. Here, the term "resin content" means the concentration of the sum of the aromatic diisocyanate and the tricarboxylic acid anhydride in the reaction system. However, the amounts of the lactam, alcohol and oxime to be used is not included in this calculation.

As the lactam, alcohol and oxime used in this invention as agents for masking the terminal functional groups of the produced polyamide-imide resin (masking agents), there may be exemplified, for example, lactams such as 2-pyrrolidone, ε-caprolactam, lauryllactam and the like; alcohols having 1 to 10 carbon atoms, such as methanol, ethanol, n-butanol, t-butanol, methyl Cellosolve, ethyl Cellosolve, methylcarbitol, benzyl alcohol, cyclohexanol, ω-hydroperfluoroalcohol and the like; oximes such as 2-butanone oxime, formaldoxime, acetaldoxime, cyclohexanone oxime and the like; etc. These masking agents preferably contain one active hydrogen in the molecule. When masking agents contain two or more active hydrogen, they become chain-elongating agents for the resin, so that the controlling of the molecular weight and the solution viscosity become difficult and moreover the heat resistance is sometimes lowered.

From the viewpoint of an effect of stabilizing the viscosity of the produced varnish, the easiness of thermal dissociation, the cost and the like, there can preferably be used ε-caprolactam as the lactam, methanol as the alcohol, and 2-butanone oxime as the oxime.

Although lactams are preferred because they hardly damage cure reactivity, they are sometimes insufficient in an effect of imparting storage stability. The problem tends to be caused particularly when the resin has a low molecular weight and a high terminal functional group concentration. When the storage stability is insufficient as described above, the problem can be solved by using the above-mentioned methanol and/or oxime according to the need.

The using amount of the lactam is 0.1 to 1.0 mole per mole of the aromatic diisocyanate. When it is less than 0.1 mole, the storage stability becomes insufficient. When it exceeds 1.0 mole, there is brought about a relatively slight inhibitory effect on cure reactivity, however a large amount of free lactam remains and hence the resulting varnish has a decreased resin content. When a lactam alone is used as a masking agent, its used amount is preferably in the range of 0.3 to 1.0 mole per mole of the aromatic diisocyanate. When a mixed system of a lactam and an alcohol and/or an oxime is used as masking agent, the using amount of the lactam is preferably in the range of 0.2 to 0.8 mole per mole of the aromatic diisocyanate.

The using amount of the alcohol and/or the oxime is 0.01 to 0.5 mole per mole of the aromatic diisocyanate. When it is less than 0.01 mole, there is brought about only an insufficient effect on the storage stability. When it exceeds 0.5 mole, the cure reactivity is greatly lowered, so that a baked coating film formed by using the resulting varnish is deteriorated in practical performance characteristics. It is particularly preferably in the range of 0.01 to 0.3 mole.

The addition of the lactam and of the alcohol and/or the oxime to be used if necessary is conducted before, during or after the reaction described above. They may be added after the polyamide-imide resin is produced and then diluted with another solvent. They may be added either in full at a time or stepwise. It is preferable to add a part of or the whole of the lactam before or during the reaction from the viewpoint of controlling the polymerization and suppressing the formation of bubbles by rapid decarboxylation. However, the alcohol and/or the oxime are preferably added after the reaction because they sometimes damage the polymerization. When the alcohol and/or the oxime are added and reacted before or during the above-mentioned reaction, it is preferable to use the alcohol and/or the oxime in a proportion of less than 0.25 mole per mole of the aromatic diisocyanate. When they are used in a proportion of 0.25 mole or more, they tend to damage polymerization or cure reaction.

When at least one masking agent is added before or during the reaction, it is preferable to conduct the reaction at a temperature of 80° to 200° C. The reaction temperature of 160° C. or lower is preferable in order to suppress side reactions such as network formation. It is most suitable to conduct the reaction at about 130° C. When at least one masking agent is added after the reaction, it is preferable to conduct the reaction at a temperature of 80° to 160° C. The reaction temperature can be made lower and lower when the reaction is effected at higher and higher resin content. For example, when the resin content is 60% by weight, the reaction temperature is most suitably about 110° C.

In a method by which at least one masking agent is added after the reaction, it is necessary to completely mask the terminal functional groups by further effecting the reaction at 0° to 130° C. up to 7–8 hours after the addition. The reaction temperature in this case is most suitably about 90° C.

The polyamide-imide resin composition used in this invention should have a reduced viscosity of 0.10 to 0.27. When the reduced viscosity is lower than 0.10, the storage stability or practical performance characteristics such as heat resistance, flexibility and the like become insufficient. When the reduced viscosity exceeds 0.27, the resin content is lowered so as to make it impossible to achieve the object of this invention. The reduced viscosity can be adjusted by measuring the solution viscosity during the reaction. The reduced viscosity is measured in the following manner. To 1 liter of water is added 15 g of a solution prepared by adding N-methylpyrrolidone to a part of a resin solution obtained by the above-mentioned reaction so as to adjust the concentration to 10% by weight, whereby the resin is precipitated. Subsequently, the precipitate is dried under a vacuum of 0.3 mmHg at 60° C. for 10 hours to obtain a solid resin. The solid resin is made into a dimethylformamide solution having a concentration of 0.5 g/dl, and the viscosity of the thus obtained solution is measured at 30° C. by using a Cannon-Fenske viscometer (viscometer number 50).

When the polyamide-imide resin obtained in this invention is made into a varnish, there may be used, as co-solvents, xylene, NISSEKI HISOL-100, 150 (trade names, mfd. by Nippon Petrochemicals Co., Ltd.), methyl Cellosolve acetate, ethyl Cellosolve acetate, γ-butyrolactone and the like in combination with the basic organic solvents described above.

If necessary, catalysts for promoting cure or catalysts for dissociating urethane may be co-used in the polyamide-imide resin composition. There are used, for example, tertiary amines such as triethylamine, triethylenediamine, dimethylaniline, dimethylethanolamine, 1,8-diaza-bicyclo(5,4,0)undecene-7 (or its organic acid salts), and the like; organotin compounds such as dibutyltin dilaurate, dibutyltin dioctoate and the like; organic titanium compounds such as tetrabutoxy titanate, tetraisopropoxy titanate, chelate or acylate compounds thereof, and the like; trialkylphosphine; etc. In particular, the tertiary amines are preferred. If necessary, various additives such as curing agents, surfactants and the like may be added to the polyamide-imide resin composition.

As the curing agents, there can be used epoxy resins, amino resins, phenol-formaldehyde resins, polyester resins having one or more hydroxyl groups and/or carboxyl groups, adducts of an aromatic polyisocyanate with any of the previously described compounds containing one active hydrogen in the molecular, etc. There are preferably used adducts of any of the previously described aromatic diisocyanates or trimers thereof with a compound having one active hydrogen in the molecule, particularly preferably an ε-caprolactam adduct of 4,4'-diphenylmethane diisocyanate.

As another additive, benzoin is preferably used. Benzoin can improve the smoothness of the resulting coated film.

When the composition is used, for example, as a varnish for heat-resistant electric wire for die coating, the thus obtained varnish can have a high resin content of about 40 to 55% by weight when the solution viscosity is set at 25 to 35 poises (30° C). When used as a varnish for heat-resistant electric wire for felt coating, the obtained varnish can have a high resin content of about 20 to 35% by weight when the solution viscosity is set at 0.6 to 0.8 poise (30° C). These varnishes are excellent in long-term storage stability, and the resulting baked coated films formed by using them are good in heat resistance and flexibility and moreover excellent in Freon resistance and crazing resistance.

The thus obtained polyamide-imide resin composition is coated on an electric conductor directly or via another insulating material and baked to give an insulated wire excellent in heat resistance, abrasion resistance, chemical resistance, and the like. As the electric conductor, there can be used a conventionalone such as copper wire, or the like. It is possible to coat the polyamide-imide resin composition directly on the electric conductor and bake it, followed by coating of another insulating material thereon and baking. It is also possible to coat another insulating material on the electric conductor and bake it, followed by coating of the polyamide-imide resin composition thereon and baking. Further, the polyamide-imide resin and/or other insulating material(s) may be coated on the double-layer structure thus obtained in any order, followed by baking to give an insulated wire having a multi-layer structure.

As the other insulating materials, there can be used substantially linear thermoplastic polyesters, branched thermosetting polyesters, polyamides, polyvinyl formals, polyurethanes, polyimides, polyimidazoles, polyimidazopyrrolones, polyhydantoins, polyesterimides, polyamide-imide-esters, epoxy resins, etc., and various autohesive varnishes.

As methods for coating and baking the polyamide-imide resin composition and other insulating materials, any conventional methods can be used and there is no particular limitation thereto. For example, it is general to pass an electric conductor through the polyamide-imide resin composition or other insulating material solution, to adjust the thickness via a die made of metal or by using a felt, to bake the resin while passing through a furnace and to repeat these procedures several times.

This invention is explained below referring to Examples and Comparative Examples.

COMPARATIVE EXAMPLE 1

In a 2-liter four-necked flask equipped with a thermometer, a stirrer and an Allihn condenser, 452.5 g of 4,4'-diphenylmethane diisocyanate, 347.5 g of trimellitic acid anhydride and 1485.7 g of N-methylpyrrolidone were placed and reacted with stirring in a nitrogen stream at 100° C. for 1 hour, at 115° C. for 2 hours, and then at 120° C. for 2 hours, and subsequently heated to 135° C. and reacted for 6 hours (the resin content was 35% by weight). The reaction solution was diluted by adding 381 g of xylene. The resin content (calculated value) of the thus obtained varnish of a polyamide-imide resin was 30% by weight, and the initial viscosity (B-type viscometer, 30° C.) was 31 poises. The reduced viscosity (0.5 g/dl, dimethylformamide, 30° C.) of the polyamide-imide resin was 0.42. The varnish underwent no change in viscosity at all even when allowed to stand at 40° C. for 1 month.

COMPARATIVE EXAMPLE 2

In a 2-liter four-necked flask equipped with a thermometer, a stirrer and an Allihn condenser, 452.5 g of 4,4'-diphenylmethane diisocyanate, 347.5 g of trimellitic acid anhydride and 533.3 g of N-methylpyrrolidone were placed and reacted with stirring in a nitrogen stream at 100° C. for 1 hour and then at 115° C. for 2 hours (the resin content was 60% by weight). The reaction solution was diluted by adding 267 of N-methylpyrrolidone. The resin content (calculated value) of the thus obtained varnish of a polyamide-imide resin was 50% by weight, and the initial viscosity (B-type viscometer, 30° C.) of the varnish was 32 poises. The reduced viscosity (0.5 g/dl, dimethylformamide, 30° C.) of the polyamide-imide resin was 0.15. The varnish had a viscosity of 1,000 poises or higher after being allowed to stand at 23° C. for 10 days, and was thus very low in storage stability.

COMPARATIVE EXAMPLE 3

In a 2-liter four-necked flask equipped with a thermometer, a stirrer and an Allihn condenser, 452.5 g of 4,4'-diphenylmethane diisocyanate, 347.5 g of trimellitic acid anhydride, 145.0 g of ε-caprolactam and 533.3 g of N-methylpyrrolidone were placed and reacted with stirring in a nitrogen stream at 90° C. for 1 hour and then at 115° C. for 1 hour, after which the reaction was further proceeded at 135° C.

The reaction solution was cooled to 70° C. when the Gardner viscosity at 30° C. became 30 seconds. Thereto was added 20.5 g of methanol, and the resulting solution was allowed to react at said temperature for 1 hour and then at 90° C. for 2 hours. The reduced viscosity of the resulting resin was 0.09 (0.5 g/dl, dimethylformamide, 30° C.). The resin content (calculated value) of the thus obtained varnish of the polyamide-imide resin was 60% by weight. The varnish had an initial viscosity of 42 poises (30° C.), and had a viscosity of 56 poises after being allowed to stand at 40° C. for 1 month.

EXAMPLE 1

In a 2-liter four-necked flask equipped with a thermometer, a stirrer and an Allihn condenser, 452.5 g of 4,4'-diphenylmethane diisocyanate, 347.5 g of trimellitic acid anhydride, 96.7 g of ε-caprolactam and 533.3 g of N-methylpyrrolidone were placed and reacted with stirring in a nitrogen stream at 100° C. for 1 hour, at 115° C. for 2 hours and then at 125° C. for 1 hour, after which the reaction was further proceeded at 135° C. The reaction solution was cooled to 100° C. when the Gardner viscosity at 30° C. of the solution prepared, as a sample for judging the end point, by diluting a part of the reaction solution so as to adjust the resin content to 40% by weight, became 25 seconds. Thereafter, the reaction solution was diluted by adding 272.4 g of N-methylpyrrolidone, 345.3 g of dimethylformamide and 2.7 g of methanol. Subsequently, the resulting solution was allowed to react at 90° C. for 3 hours. The reduced viscosity of the resulting resin was 0.24 (0.5 g/dl, dimethylformamide, 30° C.). The resin content (calculated value) of the thus obtained varnish of the polyamide-imide resin was 41% by weight. The varnish had an initial viscosity of 28 poises (30° C.), and has a viscosity of 29 poises (30° C.) after being allowed to stand at 40° C. for 1 month: it thus showed excellent storage stability.

EXAMPLE 2

In a 2-liter four-necked flask eqipped with a thermometer, a stirrer and an Allihn condenser, 456.4 g of 4,4'-diphenylmethane diisocyanate, 343.6 g of trimellitic acid anhydride, 533.3 g of N-methylpyrrolidone and 48.4 g of ε-caprolactam were placed and reacted with stirring in a nitrogen stream at 100° C. for 1 hour, at 115° C. for 2 hours, and then at 125° C. for 1 hour, after which the reaction was further proceeded at 135° C. The reaction solution was cooled to 100° C. when the Gardner viscosity at 30° C. of the solution prepared, as a sample for judging the end point, by diluting a part of the reaction solution so as to adjust the resin content to 44% by weight, became 29 seconds. Thereafter, the reaction solution was diluted by adding 484.9 g of dimethylformamide and 18.6 g of 2-butanone oxime. Subsequently, the resulting solution was allowed to react at 90° C. for 3 hours. The reduced viscosity of the resulting resin was 0.21 (0.5 g/dl, dimethylformamide, 30° C.). The resin content (calculated value) of the thus obtained varnish of the polyamide-imide resin was 44% by weight. The varnish had an initial viscosity of 34 obtained enamel wires were evaluated. The results are shown in Table 1.

In Examples 1 to 3 and Comparative Examples 1 and 3, the coating and baking time was 8 times.

EXAMPLE 4

An insulated wire was obtained by coating the varnish obtained in Example 1 on a copper wire and baking in the same manner as mentioned in Example 1, and repeating 6 times.

Characteristics of the thus obtained insulated wire are as shown in Table 1.

TABLE 1

| Example No. | Comparative Example 1 | Comparative Example 3 | Example 1 | Example 2 | Example 3 | Example 4 |
|---|---|---|---|---|---|---|
| Coating and baking time (times) | 8 | 8 | 8 | 8 | 8 | 6 |
| Flexibility* (10% elongation) | 1X OK | 4X OK | 1X OK | 1X OK | 1X OK | 1X OK |
| Cut through temperature* (2 kg) (°C.) | >400 | 390 | >400 | >400 | >400 | >400 |
| Abrasion resistance* (600 g) (times) | 130 | 95 | 130 | 120 | 120 | 125 |
| Heat shock* (240° C.-1 hr) | 1X OK | 4X OK | 1X OK | 1X OK | 1X OK | 1X OK |
| BDV retention rate** (260° C.) (%) | >80 | >75 | >80 | >80 | >80 | >80 |

Note to Table 1:
Baking conditions:
Diameter of wire: 1 mm,
Coating conditions: 8 times by using a die.
Furnace length: 4.5 m
Furnace temperature:
inlet 260° C.
middle 360° C.
outlet 400° C.
Linear speed of wire: 10 m/min
*According to JIS C 3003
**After deteriorated with heating for 168 hours, retention rate of breakdown voltage was compared with the initial value.

poises (30° C.), and had a viscosity of 36 poises (30° C.) after being allowed to stand at 40° C. for 1 month; it thus showed excellent storage stability.

EXAMPLE 3

In a 2-liter four-necked flask equipped with a thermometer, a stirrer and an Allihn condenser, 452.5 g of 4,4'-diphenylmethane diisocyanate, 347.5 g of trimellitic acid anhydride, 96.7 g of ε-caprolactam and 533.3 g of N-methylpyrrolidone were plased and reacted with stirring in a nitrogen stream at 100° C. for 1 hour, at 115° C. for 2 hours, and then at 125° C. for 1 hour, after which the reaction was further proceeded at 135° C. The reaction solution was cooled to 100° C. when the Gardner viscosity at 30° C. of the solution prepared, as a sample for judging the end point, by diluting a part of the reaction solution so as to adjust the resin content to 45% by weight, became 28 seconds. Thereafter, the reaction solution was diluted by adding 444.4 g of dimethylformamide. Thereto was added 13.7 g of methanol, and the resulting solution was allowed to react at 90° C. for 3 hours. The reduced viscosity of the resulting resin was 0.21 (0.5 g/dl, dimethylformamide, 30° C.). The resin content (calculated value) of the thus obtained varnish of the polyamide-imide resin was 45% by weight. The varnish had an initial viscosity of 30 poises (30° C.). The varnish had a viscosity of 30 poises (30° C.) after being allowed to stand at 40° C. for 1 month and thus showed excellent storage stability.

Each of the varnishes obtained in Examples 1, 2, 3 and Comparative Examples 1 and 3 was coated on a copper wire and baked by a conventional method to obtain an enamel wire, and characteristics of the thus As is clear from Table 1, the insulated wires of Examples 1 to 3 show the same excellent heat resistance, abrasion resistance and flexibility as that of Comparative Example 1 which is a conventional insulated wire obtained by using a varnish having a low resin content (30% by weight). According to this invention, since the polyamide-imide resin composition having a high resin content is used, the production cost and transport cost of the varnish are substantially reduced due to the high resin content, which results in lowering the production cost of insulated wire accordingly. Further, as shown in Examples 1 and 4, the coating and baking time can be reduced without substantially reducing the characteristics of the insulated wire; this is very economical.

What is claimed is:

1. An insulated wire obtained by coating on an electric conductor directly or via another insulating material a polyamide-imide resin composition prepared by a process comprising
   reacting an aromatic diisocyanate and a tricarboxylic acid anhydride in approximately equimolar amounts in the presence of a basic solvent at a reaction temperature of about 160° C. or less while adjusting the resin content at 40% by weight or more,
   adding to the reaction system a lactam in an amount of 0.1 to 1.0 mole per mole of the aromatic diisocyanate so as to mask terminal functional groups present in the reaction system and to make the reduced viscosity of the resin 0.1 to 0.27, and
   baking the resin composition.

2. An insulated wire according to claim 1, wherein the aromatic diisocyanate is 4,4'-diphenylmethane diisocyanate or tolylene diisocyanate.

3. An insulated wire according to claim 1, wherein the tricarboxylic acid anhydride is trimellitic anhydride.

4. An insulated wire according to claim 1, wherein the basic solvent is N-methylpyrrolidone or dimethylformamide.

5. An insulated wire according to claim 1, wherein the lactam is ε-caprolactam.

6. An insulated wire according to claim 1, wherein the another insulating material is at least one member selected from the group consisting of substantially linear thermoplastic polyesters, branched thermosetting polyesters, polyamides, polyvinyl formals, polyurethanes, polyimides, polyimidazoles, polyimidazopyrrolones, polyhydantoins, polyesterimides, polyamide-imide-esters, and epoxy resins.

7. An insulated wire according to claim 1, wherein the addition of lactam to the reaction system is conducted during the reaction of the aromatic diisocyanate and the tricarboxylic acid anhydride.

8. An insulated wire according to claim 1, wherein the addition of lactam to the reaction system is conducted before the reaction of the aromatic diisocyanate and the tricarboxylic acid anhydride.

9. An insulated wire according to claim 1, wherein the addition of lactam to the reaction system is conducted after the reaction of the aromatic diisocyanate and the tricarboxylic acid anhydride.

10. An insulated wire obtained by coating on an electric conductor directly or via another insulating material a polyamide-imide resin composition prepared by a process comprising reacting an aromatic diisocyanate and a tricarboxylic acid anhydride in approximately equimolar amounts in the presence of a basic solvent at a reaction temperature of about 160° C. or less while adjusting the resin content at 40% by weight or more, adding to the reaction system a lactam in an amount of 0.1 to 1.0 mole per mole of the aromatic diisocyanate, and adding at least one member selected from the group consisting of an alcohol and an oxime in an amount of 0.01 to 0.5 mole per mole of the aromatic diisocyanate to the reaction system so as to mask terminal functional groups present in the reaction system and to make the reduced viscosity of the resin 0.1 to 0.27, and baking the resin composition.

11. An insulated wire according to claim 10, wherein the alcohol is methanol and the oxime is 2-butanone oxime.

12. An insulated wire according to claim 10, wherein the polyamide-imide resin is prepared by adding a lactam to the reaction system during the reaction of the aromatic diisocyanate and the tricarboxylic acid anhydride and adding at least one member selected from the group consisting of an alcohol and an oxime to the reaction system after the reaction of the aromatic diisocyanate and the tricarboxylic acid anhydride to mask terminal functional groups.

13. An insulated wire according to claim 10, wherein the addition of lactam to the reaction system and the addition of at least one member selected from the group consisting of an alcohol and an oxime to the reaction system are conducted simultaneously during the reaction of the aromatic diisocyanate and the tricarboxylic acid anhydride.

14. An insulated wire according to claim 10, wherein the addition of lactam to the reaction system and the addition of at least one member selected from the group consisting of an alcohol and an oxime to the reaction system are conducted simultaneously after the reaction of the aromatic diisocyanate and the tricarboxylic acid anhydride.

15. An insulated wire according to claim 10, wherein the addition of lactam to the reaction system and the addition of at least one member selected from the group consisting of an alcohol and an oxime to the reaction system are conducted separately during the reaction of the aromatic diisocyanate and the tricarboxylic acid anhydride.

16. An insulated wire according to claim 10, wherein the addition of lactam to the reaction system is conducted after the reaction of the aromatic diisocyanate and the tricarboxylic acid anhydride and then the addition of at least one member selected from the group consisting of an alcohol and an oxime to the reaction system is conducted.

17. An insulated wire according to claim 10, wherein the aromatic diisocyanate is 4,4'-diphenylmethane diisocyanate or tolylene diisocyanate.

18. An insulated wire according to claim 10, wherein the tricarboxylic acid anhydride is trimellitic anhydride.

19. An insulated wire according to claim 10, wherein the basic solvent is N-methylpyrrolidone or dimethylformamide.

20. An insulated wire according to claim 10, wherein the lactam is ε-caprolactam.

21. An insulated wire according to claim 10, wherein the another insulating material is at least one member selected from the group consisting of substantially linear thermoplastic polyesters, branched thermosetting polyesters, polyamides, polyvinyl formals, polyurethanes, polyimides, polyimidazoles, polyimidazopyrrolones, polyhydantoins, polyesterimides, polyamide-imide-esters, and epoxy resins.

22. An insulated wire according to claim 10, wherein the polyamide-imide resin is prepared by adding a lactam to the reaction system before the reaction of the aromatic diisocyanate and the tricarboxylic acid anhydride and adding at least one member selected from the group consisting of an alcohol and an oxime to the reaction system after the reaction of the aromatic diisocyanate and the tricarboxylic acid anhydride to mask terminal functional groups.

23. An insulated wire according to claim 10, wherein the addition of lactam to the reaction system and the addition of at least one member selected from the group consisting of an alcohol and an oxime to the reaction system are conducted simultaneously before the reaction of the aromatic diisocyanate and the tricarboxylic acid anhydride.

24. An insulated wire according to claim 10, wherein the addition of lactam to the reaction system and the addition of at least one member selected from the group consisting of an alcohol and an oxime to the reaction system are conducted separately before the reaction of the aromatic diisocyanate and the tricarboxylic acid anhydride.

* * * * *